(12) United States Patent
Post

(10) Patent No.: US 8,760,021 B2
(45) Date of Patent: Jun. 24, 2014

(54) CENTRIFUGALLY DECOUPLING TOUCHDOWN BEARINGS

(75) Inventor: Richard F. Post, Walnut Creek, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 500 days.

(21) Appl. No.: 13/118,857

(22) Filed: May 31, 2011

(65) Prior Publication Data

US 2011/0291506 A1 Dec. 1, 2011

Related U.S. Application Data

(60) Provisional application No. 61/350,340, filed on Jun. 1, 2010.

(51) Int. Cl.
*H02K 7/09* (2006.01)
*F16C 17/02* (2006.01)
*B21D 53/10* (2006.01)

(52) U.S. Cl.
USPC .............................. 310/90.5; 384/104; 29/898

(58) Field of Classification Search
USPC .................. 310/90.5; 384/103–104; 248/589, 248/603–604
See application file for complete search history.

(56) References Cited

U.S. PATENT DOCUMENTS

| | | | | |
|---|---|---|---|---|
| 1,491,736 A * | 4/1924 | Polk | | 417/363 |
| 1,938,799 A * | 12/1933 | Bourne | | 416/135 |
| 2,588,012 A * | 3/1952 | Kirkpatrick | | 248/603 |
| 3,506,314 A * | 4/1970 | Wildmann et al. | | 384/104 |
| 4,870,552 A * | 9/1989 | Vitta et al. | | 362/369 |
| 5,142,177 A * | 8/1992 | Higuchi et al. | | 310/90.5 |
| 5,495,221 A | 2/1996 | Post | | |
| 5,801,468 A * | 9/1998 | Choi | | 310/90 |
| 5,847,480 A * | 12/1998 | Post | | 310/90.5 |
| 2002/0079765 A1 * | 6/2002 | Lembke | | 310/90.5 |
| 2008/0252162 A1 * | 10/2008 | Post | | 310/90.5 |
| 2010/0244786 A1 * | 9/2010 | Gruendl et al. | | 322/4 |
| 2011/0291508 A1 * | 12/2011 | Post | | 310/90.5 |

* cited by examiner

*Primary Examiner* — Burton Mullins
*Assistant Examiner* — Eric Johnson
(74) *Attorney, Agent, or Firm* — John P. Wooldridge

(57) ABSTRACT

Centrifugally decoupling mechanical bearing systems provide thin tensioned metallic ribbons contained in a support structure. This assembly rotates around a stationary shaft being centered at low speeds by the action of the metal ribbons. Tension springs are connected on one end to the ribbons and on the other end to the support structure. The ribbons pass through slots in the inner ring of the support structure. The spring preloading thus insures contact (or near-contact) between the ribbons and the shaft at rotation speeds below the transition speed. Above this speed, however, the centrifugal force on the ribbons produces a tensile force on them that exceeds the spring tensile force so that the ribbons curve outward, effectively decoupling them from mechanical contact with the shaft. They still remain, however, in position to act as a touchdown bearing in case of abnormally high transverse accelerations.

28 Claims, 3 Drawing Sheets

CENTRIFUGALLY DECOUPLING TOUCHDOWN BEARINGS

CROSS-REFERENCE TO RELATED APPLICATIONS

This application claims the benefit of U.S. Provisional Patent Application No. 61/350,340 titled "A Centrifugally Decoupling Touchdown Bearing," filed Jun. 1, 2010, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to passive magnetic bearings, and more specifically, it relates to techniques for stabilizing such bearings as the bearing rotates at a rate that is less than the transition speed where the bearing is dynamically stable.

2. Description of Related Art

In the employment of ambient-temperature passive magnetic bearings based on the teachings of U.S. Pat. No. 5,495,221, "Dynamically Stable Magnetic Suspension/Bearing System," incorporated herein by reference, it is required that provision be made for stabilizing the system against displacements from equilibrium when the system is at rest or when it is being brought up through the "transition speed," the rotation speed above which the stabilizer elements become effective. As described in the cited patent, this requirement is to be fulfilled by employing a mechanical bearing that becomes decoupled above the transition speed. One method of achieving this result is to rely on centrifugal forces to accomplish the decoupling. An example of such a system is shown in FIG. 16 of the cited patent.

Motor and generator armatures, flywheel rotors, and other rotatable components have conventionally been supported and constrained against radially and axially directed forces by mechanical bearings, such as journal bearings, ball bearings, and roller bearings. Such bearings necessarily involve mechanical contact between the rotating element and the bearing components, leading to problems of friction and wear that are well known. Even non-contacting bearings, such as air bearings, involve frictional losses that can be appreciable, and are sensitive to the presence of dust particles. In addition, mechanical bearings, and especially air bearings, are poorly adapted for use in a vacuum environment.

The use of magnetic forces to provide a non-contacting, low friction equivalent of the mechanical bearing is a concept that provides an attractive alternative, one which is now being exploited commercially for a variety of applications. All presently available commercial magnetic bearing/suspension elements are subject to limitations, arising from a fundamental physics issue, that increase their cost and complexity. These limitations make the conventional magnetic bearing elements unsuitable for a wide variety of uses where complexity-related issues, the issue of power requirements, and the requirement for high reliability are paramount.

The physics issue referred to is known by the name of Earnshaw's Theorem. According to Earnshaw's Theorem (when it is applied to magnetic systems), any magnetic suspension element, such as a magnetic bearing that utilizes static magnetic forces between a stationary and a rotating component, cannot exist stably in a state of equilibrium against external forces, e.g., gravity. In other words if such a bearing element is designed to be stable against radially directed displacements, it will be unstable against axially directed displacements, and vice versa. The assumptions implicit in the derivation of Earnshaw's Theorem are that the magnetic fields are static in nature (i.e., that they arise from either fixed currents or objects of fixed magnetization) and that diamagnetic bodies are excluded.

The almost universal response to the restriction imposed by Earnshaw's Theorem has been the following: Magnetic bearing elements are designed to be stable along at least one axis, for example, their axis of symmetry, and then external stabilizing means are used to insure stability along the remaining axes. The "means" referred to could either be mechanical, i.e., ball bearings or the like, or, more commonly, electromagnetic. In the latter approach magnet coils are employed to provide stabilizing forces through electronic servo amplifiers and position sensors that detect the incipiently unstable motion of the rotating element and restore it to its (otherwise unstable) position of force equilibrium.

Less common than the servo-controlled magnetic bearings just described are magnetic bearings that use superconductors to provide a repelling force acting against a permanent magnet element in such a way as to stably levitate that magnet. These bearing types utilize the flux-excluding property of superconductors to attain a stable state, achieved by properly shaping the superconductor and the magnet so as to provide restoring forces for displacements in any direction from the position of force equilibrium. Needless to say, magnetic bearings that employ superconductors are subject to the limitations imposed by the need to maintain the superconductor at cryogenic temperatures, as well as limitations on the magnitude of the forces that they can exert, as determined by the characteristics of the superconductor employed to provide that force.

The magnetic bearing approaches that have been described represent means for creating a stable situation in the face of the limitations imposed by Earnshaw's Theorem. The approach followed by the first one of these (i.e., the one not using superconducting materials) is to overcome these limitations by introducing other force-producing elements, either mechanical, or electromagnetic in nature, that restore equilibrium. The latter, the servo-controlled magnetic bearing, is usually designated as an "active" magnetic bearing, referring to the active involvement of electronic feedback circuitry in maintaining stability.

The elements described referred to above, in some cases with already known elements, to levitate a rotating system that is maintained in a state of dynamic equilibrium without the use of active feedback circuitry. The avoidance of the instability predicted by Earnshaw's Theorem comes about by a combination of satisfying, for the system as a whole, some well-defined stability criteria, together with the employment of dynamic effects. That is, the system must be passively stabilized above a low critical speed. Below this speed conventional elements, such as ball bearings, may be used to maintain stability, with centrifugally activated means provided to disengage these mechanical elements for speeds higher than the critical speed. It is desirable to provide alternate means for maintaining stability at speeds below the critical speed. The present invention provides such alternate means.

SUMMARY OF THE INVENTION

It is an object of the present invention to provide centrifugally decoupling touchdown bearings especially for use in dynamically stable magnetic bearing systems This and other objects will be apparent based on the disclosure herein.

The present invention is an improved version of a centrifugally decoupling mechanical bearing. This improved version also can be configured so as to function as a "touchdown" bearing for the rotating system should it be subjected to transverse accelerations (for example seismic events) that are too large to be sustained by the magnetic bearing system.

The invention includes a rotatable outer support structure having a ring shape, at least three tension springs attached to the inner wall of the support structure and a ribbon attached from each the tension spring to each other the tension spring. The ribbons are often made of metal foil. A stationary shaft is attached to a support that is external to the outer support structure, where the outer support structure is configured to rotate about the stationary shaft. When the support structure is stationary, the ribbon touches the stationary shaft. The tension springs are configured to compress when the outer support structure rotates at and above a selected rotational velocity which is the transitional velocity of a dynamically stable magnetic bearing. The tension springs are about evenly spaced apart from one another. An inner support structure located concentric to the outer support structure includes ribbon passageways through which the ribbons pass and which adds support to the ribbons. The inner support is attached to the outer support.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
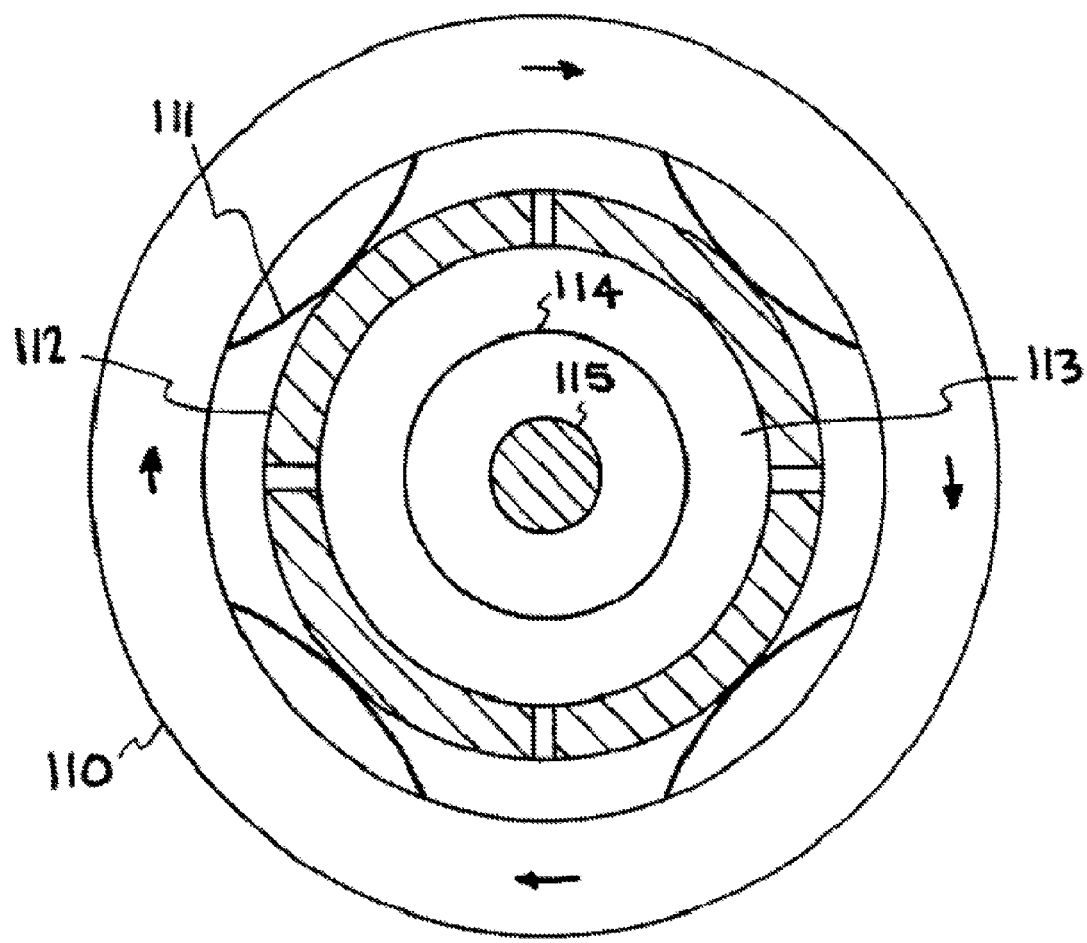
FIG. 1 shows a prior art schematic of a centrifugally decoupled touchdown bearing.

It is required for a Dynamically stable magnetic suspension/bearing system to operate successfully that mechanical or other means be provided to maintain stability when the rotating element is at rest, or when rotating below a low critical speed determined by the design. To accomplish this end various elements can be used, whereby centering elements act below a critical speed, and are thereafter disengaged, for example by centrifugal action. A prior art centrifugally disengaging mechanical bearing is shown schematically in FIG. 1. It is comprised of an outer (rotating) element 110, spring elements 111, and retainer quadrants 112. Retainers 112 remain in contact with the outer race 113 of a ball bearing, the inner race 114 of which is non-rotating and which is held in position by shaft 115. As shown, a ball bearing acts on the rotating element at zero or slow speeds, and then is disengaged by the action of spring-like elements 111 that expand under the influence of centrifugal forces. Other means for achieving this end will be apparent to those skilled in the art. As a part of the present invention, it should be recognized that disengaging mechanical elements of the type described can have a dual function. They not only can function to maintain stability while the rotating element is spun up from zero speed, but if properly designed, they can act as "backup" bearings to accommodate momentary accelerations such as from seismic effects (in stationary systems) or road shocks in mobile systems.

Practical achievement of the objectives toward achieving a stable passive magnetic bearing requires three critical steps. The first of these is to choose from among the specific bearing elements that have been described the set of which is to be used in the contemplated application. That is, bearing elements must be chosen which, when taken together, are capable in principle of satisfying the stability requirements contained in equations 4 and 5 of the incorporated patent. For example, if two (only) magnetic elements are to be employed, and if one of the elements is intrinsically stable against radial displacements, but not against axial displacements, then it must be paired with another element that provides, over a finite range of displacements, a sufficiently large negative axial force derivative to overcome the unstable axial force derivative of the first element. The pair then could be used, for example, to support a rotor pendulously. Alternatively, they could be used together with other compatible elements (i.e., with compatible force derivatives) to levitate a rotating object where levitating forces are being provided at both ends.

The second required step in the design of a practical implementation of the invention is, either by analytical or computational means, or by consulting previously compiled design tables, to design the chosen elements so that their force derivatives are, taken together with the other elements, compatible with the requirements of equations 4 and 5 of the cited patent.

The third step is to include a disengaging mechanical bearing element in the design, one that will maintain stability as the rotor is spun up from rest, until the critical speed where the magnetic elements, alone, provide stability. Alternatively to the present invention, instead of using a disengaging mechanical element to accomplish this end, in some circumstances it might be preferable to use a temporarily activated servo-type system of the general type used in commercial magnetic bearing systems. In this case the servo system would be activated only during start-up, but then would be turned off as soon as the critical speed where the passive elements took over was reached. For rotating systems that would normally be operating continuously, their performance would in this way not be dependent on the reliability of the servo system, nor would there be continued power losses associated with this system, since it would be turned off during normal operation.

Figure 2:
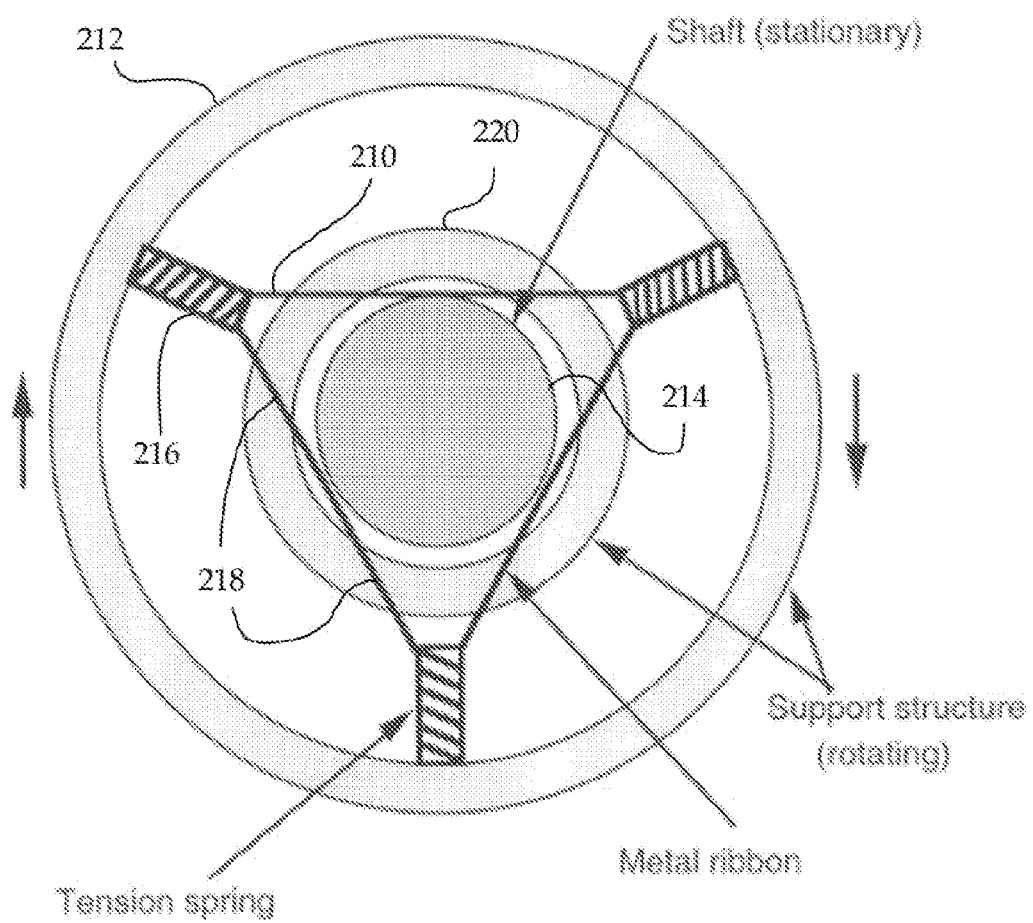
FIG. 2 shows a schematic of a centrifugally decoupled touchdown bearing according to the present invention.

The salient features of the present centrifugally decoupling mechanical bearing system are shown in the FIG. 2. As shown in the figure, the bearing is of the "foil" type, in which thin tensioned metallic ribbons 210 are contained in a support structure 212. This assembly rotates around a stationary shaft 214 (for example, Teflon-coated steel) being centered at low speeds by the action of the metal ribbons. As shown, tension springs 216 are provided, connected on one end to the ribbons and on the other end to the support structure 212. The ribbons pass through slots 218 in the inner ring 220 of the support structure. The spring preloading thus insures contact (or near-contact) between the ribbons and the shaft at rotation speeds below the transition speed. Above this speed, however, the centrifugal force on the ribbons will produce a tensile force on them that exceeds the spring tensile force so that the ribbons curve outward, effectively decoupling them from mechanical contact with the shaft. They still remain, however, in position to act as a touchdown bearing in case of abnormally high transverse accelerations. When acting as a touchdown bearing, the asymmetric nature of the stiffness of this type of bearing should help to suppress tendencies toward whirl instabilities.

Figure 3:
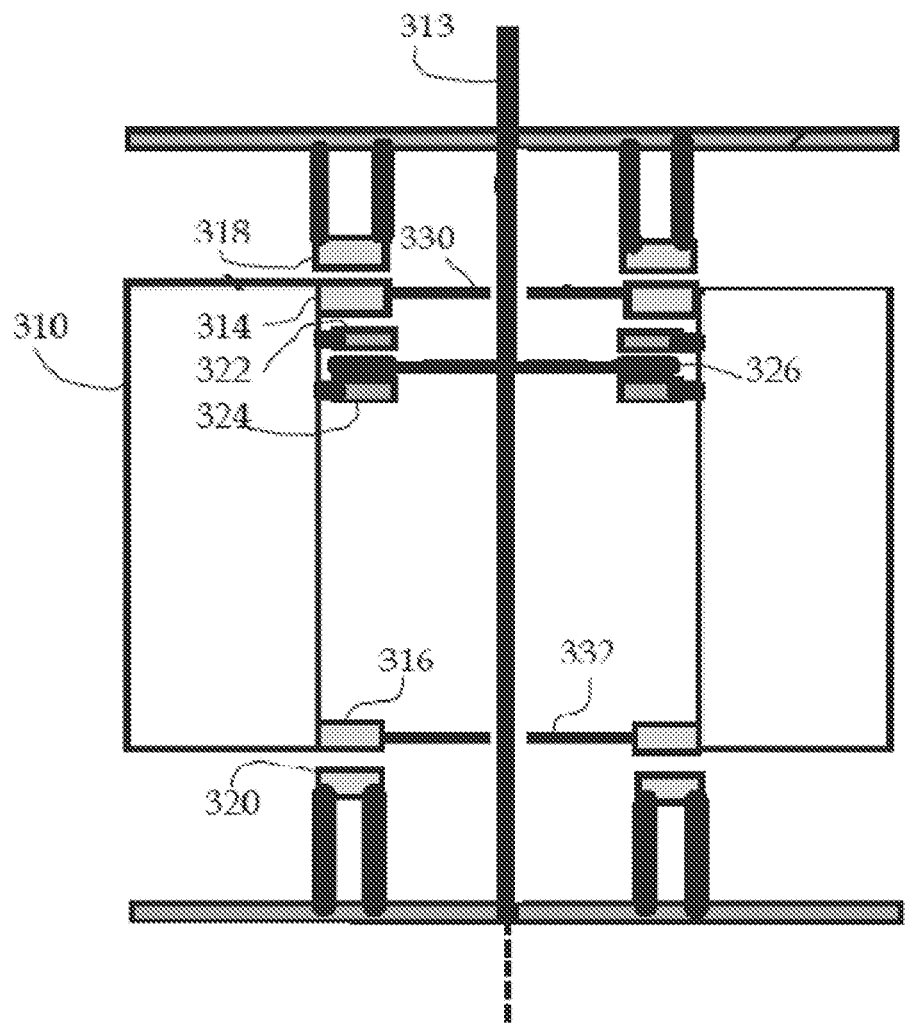
FIG. 3 shows a passive magnetic bearing system utilizing a an embodiment of the present centrifugally decoupling bearing.

U.S. patent application Ser. No. 12/985,980, titled, "Improved Passive Magnetic Bearing System," filed Jan. 6, 2011, incorporated herein by reference, describes a vertical-axis system, the levitation of which is accomplished by a combination of a lower repelling magnet assembly plus an upper attracting magnet assembly. This system can be modified to include the present centrifugally disengaging mechanical bearing. The positive stiffness for radial displacements of the upper (attracting) magnet assembly is by design made to be greater than the negative stiffness of the lower (repelling) magnet assembly so that the coupled assembly is stable against transverse displacements and tilt displacements from equilibrium, but unstable against vertical displacements. To render the system also stable against vertical displacements an improved Halbach-array stabilizer (described below) is employed, as described in U.S. patent application Ser. No. 12/985,980. Alternately, if the lower magnet assembly has a greater negative (repelling) stiffness than the radial stiffness of the upper (attracting) magnet assembly, the bearing system will be stable against vertical displacements and tilt displacements, but will be unstable against transverse displacements. FIG. 3 shows the exemplary embodiment utilizing the present centrifugally disengaging mechanical bearing, and includes a rotor 310 having an axis of rotation that is co-linear with support shaft 313 and including a first magnet 314 at a first end of the rotor and a second magnet 316 at the other end of the rotor. A first bearing magnet 318 is positioned to attract the first magnet and is fixedly mounted external to the rotor. A second bearing magnet 320 is positioned to repel the second magnet and is fixedly mounted external to the rotor. In some embodiments, second bearing magnet 320 is configured to attract the second magnet. A first Halbach array 322 and a second Halbach array 324 are attached to the inner wall of the rotor. A conductor array 326 comprising windings is located between the first Halbach array and the second Halbach array. The conductor array is fixedly mounted, in this embodiment, directly to support shaft 313, which is external to the rotor. To provide support for the rotor until it reaches the transition speed and to act as a touchdown bearing, a first centrifugally decoupling bearing, as shown in FIG. 2, is supported at the end of support member 330, which is attached to the first magnet 314. It should be noted that this is but one example location for the support member and the decoupling bearing. A basic requirement for the location of these elements is that they be in rigid connection with the rotor 310. Additional decoupling bearings can be included in this system. For example, a second support member 332 is attached to second magnet 316. It should be noted that the supports 330 and 332 are shown in cross-section and may comprise a disc shape that spans the entire inner radius of the element to which they are attached. A wide variety of other configurations will be apparent to those skilled in the art based on this description. Further, implementation of this decoupling bearing in other dynamically stable magnetic bearing systems and passive magnetic bearing systems will be apparent to those skilled in the art based on the present disclosure.

Accordingly, embodiments of the present centrifugally decoupling bearing comprise a rotatable outer support structure having a ring shape; a plurality of tension springs attached to the inner wall of the support structure; and a plurality of ribbons, where a first ribbon of the plurality of ribbons is connected from a first spring of the plurality of tension springs to a second spring of the plurality of tension springs, where the second spring is adjacent to the first spring, where a second ribbon of the plurality of ribbons is connected from the second spring to a third tension spring of the plurality of tension springs and where the plurality of ribbons are connected from spring to spring of the plurality of tension springs in this manner continuing back to the first spring. The bearing may further comprise a stationary shaft fixedly attached to a stationary external support, where the rotatable outer support structure is configured to rotate about the stationary shaft. When the rotatable outer support structure is stationary or below a critical speed, the ribbons touch the stationary shaft. The plurality of tension springs are configured to expand under the tension of the plurality of ribbons when the rotatable outer support structure rotates at or above the critical speed. The plurality of ribbons are configured to flex outwardly toward the rotatable outer support structure when the outer support structure rotates at or above the critical speed such that the plurality of ribbons do not touch the shaft. The critical speed is the speed where magnetic subsystems of a dynamically stable magnetic bearing system act together to support a rotating element in a state of dynamic equilibrium. The rotating element is attached to the rotatable outer support structure. The plurality of tension springs are about evenly spaced apart from one another around the inner wall of the rotatable outer support structure. The bearing may further comprise means for rotating the outer support structure about the stationary shaft. The ribbon may comprise metallic foil. The bearing may be used with a dynamically stable magnetic bearing system, where the dynamically stable magnetic bearing system comprises a rotatable element attached to the rotatable outer support structure. The bearing may further include an inner support structure comprising a ribbon passageways, where each ribbon of the plurality of ribbons passes through two passageways of the ribbon passageways. The inner support structure is fixedly connected to the outer support structure. The outer support structure may be fixedly connected to a rotating element.

The scope of the invention includes embodiments of a method for fabricating a centrifugally decoupling bearing. An exemplary embodiment, comprises providing a rotatable outer support structure having a ring shape; attaching a plurality of tension springs to the inner wall of the rotatable outer support structure; and connecting a plurality of metal ribbons to the inner wall, where a first ribbon of the plurality of metal ribbons is connected from a first spring of the plurality of tension springs to a second spring of the plurality of tension springs, where the second spring is adjacent to the first spring, where a second ribbon of the plurality of ribbons is connected from the second spring to a third spring of the plurality of tension springs and, where the plurality of metal ribbons are connected from spring to spring of the plurality of tension springs in this manner continuing back to the first spring.

The scope of the invention includes embodiments of a method for operating a centrifugally decoupling bearing. An exemplary embodiment, comprises providing a centrifugally decoupling bearing comprising: a rotatable outer support structure having a ring shape; a plurality of tension springs attached to the inner wall of the support structure; and a plurality of metal ribbons, where a first ribbon of the plurality of metal ribbons is connected from a first spring of the plurality of tension springs to a second spring of the plurality of tension springs, where the second spring is adjacent to the first spring, where a second ribbon of the plurality of metal ribbons is connected from the second spring to a third tension spring of the plurality of tension springs and where the plurality of metal ribbons are connected from spring to spring of the plurality of tension springs in this manner continuing back to the first spring; the method further comprises providing a stationary shaft fixedly attached to a stationary external support, where the rotatable outer support structure is configured to rotate about the stationary shaft; and operating the bearing at a rotational speed around the shaft, where the speed is within a range from stationary to a speed that is greater than a critical speed, where when the rotatable outer support structure is stationary or below the critical speed, the ribbons touch the stationary shaft and provide a centering force upon the rotatable outer support structure, where when the rotatable outer support structure rotates at or above the critical speed, the plurality of tension springs expand under the tension of the plurality of metal ribbons, where the ribbons do not touch the stationary shaft.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A centrifugally decoupling bearing, comprising:
   a rotatable outer support structure having a ring shape;
   a plurality of tension springs attached to the inner wall of said rotatable outer support structure;
   a plurality of ribbons, wherein a first ribbon of said plurality of ribbons is connected from a first spring of said plurality of tension springs to a second spring of said plurality of tension springs, wherein said second spring is adjacent to said first spring, wherein a second ribbon of said plurality of ribbons is connected from said second spring to a third tension spring of said plurality of tension springs and wherein said plurality of ribbons are connected from spring to spring of said plurality of tension springs in this manner continuing back to said first spring; and
   a stationary shaft fixedly attached to a stationary external support, wherein said rotatable outer support structure is configured to rotate about said stationary shaft, wherein when said rotatable outer support structure is stationary or below a critical speed, said ribbons touch said stationary shaft.

2. The bearing of claim 1, wherein said plurality of tension springs are configured to expand under the tension of said plurality of ribbons when said rotatable outer support structure rotates at or above said critical speed.

3. The bearing of claim 1, wherein said plurality of ribbons are configured to flex outwardly toward said rotatable outer support structure when said rotatable outer support structure rotates at or above said critical speed such that said plurality of ribbons do not touch said stationary shaft.

4. A centrifugally decoupling bearing, comprising:
   a rotatable outer support structure having a ring shape;
   a plurality of tension springs attached to the inner wall of said rotatable outer support structure;
   a plurality of ribbons, wherein a first ribbon of said plurality of ribbons is connected from a first spring of said plurality of tension springs to a second spring of said plurality of tension springs, wherein said second spring is adjacent to said first spring, wherein a second ribbon of said plurality of ribbons is connected from said second spring to a third tension spring of said plurality of tension springs and wherein said plurality of ribbons are connected from spring to spring of said plurality of tension springs in this manner continuing back to said first spring; and
   a stationary shaft fixedly attached to as stationary external support, wherein said rotatable outer support structure is configured to rotate about said stationary shaft, wherein said plurality of tension springs are configured to expand under the tension of said plurality of ribbons when said rotatable outer support structure rotates at or above said critical speed, wherein said plurality of ribbons are configured to flex outwardly toward said rotatable outer support structure when said rotatable outer support structure rotates at or above said critical speed such that said plurality of ribbons do not touch said stationary shaft, wherein said critical speed is the speed wherein magnetic subsystems of a dynamically stable magnetic bearing system act together to support a rotating element in a state of dynamic equilibrium.

5. The bearing of claim 4, wherein said rotating element is attached to said rotatable outer support structure.

6. The bearing of claim 1, wherein said plurality of tension springs are about evenly spaced apart from one another around said inner wall of said rotatable outer support structure.

7. The bearing of claim 1, further comprising means for rotating said rotatable outer support structure about said stationary shaft.

8. The bearing of claim 1, wherein said plurality of ribbons comprise metallic foil.

9. The bearing of claim 1, further comprising said dynamically stable magnetic bearing system, wherein said dynamically stable magnetic bearing system comprises a rotatable element attached to said rotatable outer support structure.

10. A centrifugally decoupling bearing, comprising:
    a rotatable outer support structure having a ring shape;
    a plurality of tension springs attached to the inner wall of said rotatable outer support structure;
    a plurality of ribbons, wherein a first ribbon of said plurality of ribbons is connected from a first spring of said plurality of tension springs to a second spring of said plurality of tension springs, wherein said second spring is adjacent to said first spring, wherein a second ribbon of said plurality of ribbons is connected from said second spring to a third tension spring of said plurality of tension springs and wherein said plurality of ribbons are connected from spring to spring of said plurality of tension springs in this manner continuing back to said first spring; and
    an inner support structure comprising ribbon passageways, wherein each ribbon of said plurality of ribbons passes through two passageways of said ribbon passageways.

11. The bearing of claim 10, wherein said inner support structure is fixedly connected to said rotatable outer support structure.

12. The bearing of claim 1, wherein said rotatable outer support structure is fixedly connected to a rotating element.

13. An apparatus, comprising:
    a rotatable outer support structure;
    a plurality of tension springs comprising at least three tension springs comprising a first tension spring and a second tension spring and a third tension spring, wherein said first tension spring has an end A and an end B, wherein said end A is attached to the inner wall of said rotatable outer support structure, wherein said second tension spring has an end C and an end D, wherein said end C is attached to the inner wall of said rotatable outer support structure and wherein said third tension spring has an end E and an end F, wherein said end E is attached to the inner wall of said rotatable outer support structure; and a plurality of ribbons comprising at least three ribbons comprising a first ribbon and a second ribbon and a third ribbon, wherein said first ribbon has an end G and an end H, wherein said end G is connected to said end B and wherein said end H is connected to said end D, wherein said second ribbon has an end I and an end J, wherein said end I is connected to said end D and wherein said end J is connected to said end F and wherein said third ribbon has an end K and an end L, wherein said end K is connected to said end F and wherein said end L is connected to said end B.

14. The apparatus of claim 13, further comprising a stationary shaft fixedly attached to a stationary external support, wherein said rotatable outer support structure is configured to rotate about said stationary shaft.

15. The apparatus of claim 14, wherein when said rotatable outer support structure is stationary or below a critical speed, said first ribbon and said second ribbon and said third ribbon touch said stationary shaft.

16. The apparatus of claim 15, wherein said plurality of tension springs are configured to expand under the tension of said plurality of ribbons when said rotatable outer support structure rotates at or above said critical speed.

17. The apparatus of claim 14, wherein when said rotatable outer support structure is stationary or below a critical speed, said first ribbon and said second ribbon and said third ribbon touch said stationary shaft, wherein said plurality of tension springs are configured to expand under the tension of said plurality of ribbons when said rotatable outer support structure rotates at or above said critical speed, wherein said plurality of ribbons are configured to flex outwardly toward said rotatable outer support structure when said rotatable outer support structure rotates at or above said critical speed such that said plurality of ribbons do not touch said stationary shaft.

18. The apparatus of claim 14, wherein when said rotatable outer support structure is stationary or below a critical speed, said first ribbon and said second ribbon and said third ribbon touch said stationary shaft, wherein said plurality of tension springs are configured to expand under the tension of said plurality of ribbons when said rotatable outer support structure rotates at or above said critical speed, wherein said plurality of ribbons are configured to flex outwardly toward said rotatable outer support structure when said rotatable outer support structure rotates at or above said critical speed such that said plurality of ribbons do not touch said stationary shaft, wherein said critical speed is the speed wherein magnetic subsystems of a dynamically stable magnetic bearing system act together to support a rotating element in a state of dynamic equilibrium.

19. The apparatus of claim 18, wherein said rotating element is attached to said rotatable outer support structure.

20. The apparatus of claim 13, wherein said plurality of tension springs are about evenly spaced apart from one another around said inner wall of said rotatable outer support structure.

21. The apparatus of claim 14, further comprising means for rotating said rotatable outer support structure about said stationary shaft.

22. The apparatus of claim 13, wherein each ribbon of said plurality of ribbons comprises metallic foil.

23. The apparatus of claim 13, further comprising a dynamically stable magnetic bearing system comprising a rotatable element attached to said rotatable outer support structure.

24. The apparatus of claim 13, further comprising an inner support structure comprising ribbon passageways, wherein each ribbon of said plurality of ribbons passes through two passageways of said ribbon passageways.

25. The apparatus of claim 24, wherein said inner support structure is fixedly connected to said rotatable outer support structure.

26. The apparatus of claim 13, wherein said rotatable outer support structure is fixedly connected to a rotating element.

27. A method for fabricating a centrifugally decoupling bearing, comprising:
providing a rotatable outer support structure having a ring shape;
attaching a plurality of tension springs to the inner wall of said rotatable outer support structure;
connecting a plurality of metal ribbons to said inner wall, wherein a first ribbon of said plurality of metal ribbons is connected from a first spring of said plurality of tension springs to a second spring of said plurality of tension springs, wherein said second spring is adjacent to said first spring, wherein a second ribbon of said plurality of ribbons is connected from said second spring to a third spring of said plurality of tension springs and, wherein said plurality of metal ribbons are connected from spring to spring of said plurality of tension springs in this manner continuing back to said first spring; and
fixedly attaching a stationary shaft to a stationary external support, wherein said rotatable outer support structure is configured to rotate about said stationary shaft, wherein when said rotatable outer support structure is stationary or below a critical speed, said ribbons touch said stationary shaft.

28. A method for operating a centrifugally decoupling bearing, comprising:
providing a centrifugally decoupling bearing comprising:
a rotatable outer support structure having a ring shape;
a plurality of tension springs attached to the inner wall of said rotatable outer support structure; and
a plurality of metal ribbons, wherein a first ribbon of said plurality of metal ribbons is connected from a first spring of said plurality of tension springs to a second spring of said plurality of tension springs, wherein said second spring is adjacent to said first spring, wherein a second ribbon of said plurality of metal ribbons is connected from said second spring to a third tension spring of said plurality of tension springs and wherein said plurality of metal ribbons are connected from spring to spring of said plurality of tension springs in this manner continuing back to said first spring;
providing a stationary shaft fixedly attached to a stationary external support, wherein said rotatable outer support structure is configured to rotate about said stationary shaft; and
operating said bearing at a rotational speed around said stationary shaft, wherein said speed is within a range from stationary to a speed that is greater than a critical speed, wherein when said rotatable outer support structure is stationary or below said critical speed, said ribbons touch said stationary shaft and provide a centering force upon said rotatable outer support structure, wherein when said rotatable outer support structure rotates at or above said critical speed, said plurality of tension springs expand under the tension of said plurality of metal ribbons, wherein said ribbons do not touch said stationary shaft.

\* \* \* \* \*